United States Patent
Mars et al.

(10) Patent No.: US 7,050,571 B1
(45) Date of Patent: May 23, 2006

(54) TELEPHONE WIRE DISTRIBUTION CENTER

(75) Inventors: Mark A. Mars, Montlemont, IL (US); David W. Kirby, LeMont, IL (US)

(73) Assignee: Etcon Corporation, Burr Ridge, IL (US)

(*) Notice: Subject to any disclaimer, the term of this patent is extended or adjusted under 35 U.S.C. 154(b) by 0 days.

(21) Appl. No.: 09/450,384

(22) Filed: Nov. 29, 1999

(51) Int. Cl.
H04M 3/00 (2006.01)

(52) U.S. Cl. .............. 379/326; 379/327; 379/328

(58) Field of Classification Search ......... 379/326, 379/327, 328, 413.04, 166; 439/507, 49, 439/404, 491, 488; 361/627, 628, 637
See application file for complete search history.

(56) References Cited

U.S. PATENT DOCUMENTS

| 240,983 | A | * | 5/1881 | Ellsworth | 379/326 |
|---|---|---|---|---|---|
| 2,098,321 | A | * | 11/1937 | Trepton | 379/327 |
| 3,112,147 | A | * | 11/1963 | Pferd et al. | 439/404 |
| 3,610,810 | A | * | 10/1971 | Fribley, Jr. | 439/491 |
| 4,140,885 | A | * | 2/1979 | Verhagen | 379/166 |
| 4,176,257 | A | * | 11/1979 | DeLuca | 439/491 |
| 6,083,011 | A | * | 7/2000 | Daoud | 439/49 |
| 6,430,288 | B1 | * | 8/2002 | Frazier et al. | 379/413.04 |

OTHER PUBLICATIONS

Leviton Telecom, pp. S24-S25.

* cited by examiner

Primary Examiner—Ahmad F. Matar
Assistant Examiner—Rasha S. Al-Aubaidi
(74) Attorney, Agent, or Firm—Banner & Witcoff, Ltd.

(57) ABSTRACT

A telephone distribution center for organizing, labeling, and coupling multiple paired input telephone wires to multiple output telephone wires. Paired input lines can be coupled to respective pairs of punch down terminal strips. Each punch down terminal strip is an electrically conductive terminal strip inserted into a row of insulation displacing punch down connectors. Multiple paired output lines can be coupled to one or more punch down terminal strip pairs thereby coupling one or more paired output lines to the desired input line pair or pairs. A convenient place is provided for labeling the location of the telephone jack to which each paired output wire leads. A wire channel, wire channel hooks, and tie wire loops are provided for organizing paired input and output telephone wires. Mounting holes are also provided for fastening the telephone wire distribution center to a wall or other suitable mounting surface.

15 Claims, 2 Drawing Sheets

US 7,050,571 B1

TELEPHONE WIRE DISTRIBUTION CENTER

BACKGROUND OF THE INVENTION

1. Field of the Invention

This invention relates generally to connector panels for coupling incoming paired telephone wires to wires running to various locations in a house or other type of building.

2. Related Art

In order to comply with a new telephone industry standard called Category 5, residential homes must be wired with four paired telephone lines coming into the residence. Category 5 also requires a separate dedicated pair of wires for every telephone jack in a house.

Under previous standards, telephone jacks could be looped in series requiring significantly fewer wires at the telephone wire distribution panel or center, which is typically located in the basement of a house. A block of paired series connectors has often been used to connect an incoming paired telephone line to several telephone jacks in various locations throughout a house. A significant shortcoming of this approach is that telephone wires leading to different rooms in a house often remain unlabeled and generally disorganized, causing unnecessary time and effort to be expended whenever the paired telephone wire leading to a particular telephone jack in a particular location of a house needs to be identified, disconnected from an input line, and/connected to a second input line instead. In order to change a telephone jack from one input line to another, after identifying the line or lines leading to the telephone jack of interest, the wires will typically need to be unbundled so that the output wire can be connected to an input wire located elsewhere in the block of connectors.

In light of the requirements of Category 5, namely, four input lines and a "home run," in other words, a separate dedicated paired wire, for each wired telephone jack, wiring a home according to Category 5's requirements presents an organizational challenge not previously addressed by prior art telephone wire distribution center. Accordingly, there is a need for a paired telephone wire distribution center for organizing input and output telephone wire pairs and labeling the location or room in a house to which an output paired telephone wire is run. Such a distribution center should facilitate organizing, labeling, identification, and the ability to readily switch a particular output wire pair from a particular input pair to any of the other input wire pairs. An additional practical consideration is that such a distribution center should be inexpensive to manufacture because the individuals who run telephone wire in homes typically are very cost conscious.

SUMMARY OF THE INVENTION

Accordingly, it is an object of this invention to provide a cost-effective apparatus and method for coupling one or more paired input telephone wires to one or more paired output telephone wires while facilitating: organizing, labeling, identification, and switching a particular output wire pair from a particular input pair to any of the other input wire pairs.

A telephone distribution center for organizing and coupling multiple paired input telephone wires to multiple output telephone wires is disclosed. Paired input lines may be coupled to respective pairs of punch down terminal strips. Each punch down terminal strip may include an electrically conductive terminal strip inserted into a row of insulation displacing punch down connectors. Multiple paired output lines may be coupled to one or more punch down terminal strip pairs thereby coupling one or more paired output lines to the desired input line pair or pairs. A convenient place is provided for labeling the location of the telephone jack to which each paired output wire leads. A wire channel, wire channel hooks, and tie wire loops are provided for organizing paired input and output telephone wires. Mounting holes are also provided for fastening the telephone wire distribution center to a wall or other suitable mounting surface.

DETAILED DESCRIPTION OF THE PREFERRED EMBODIMENTS

Figure 1:
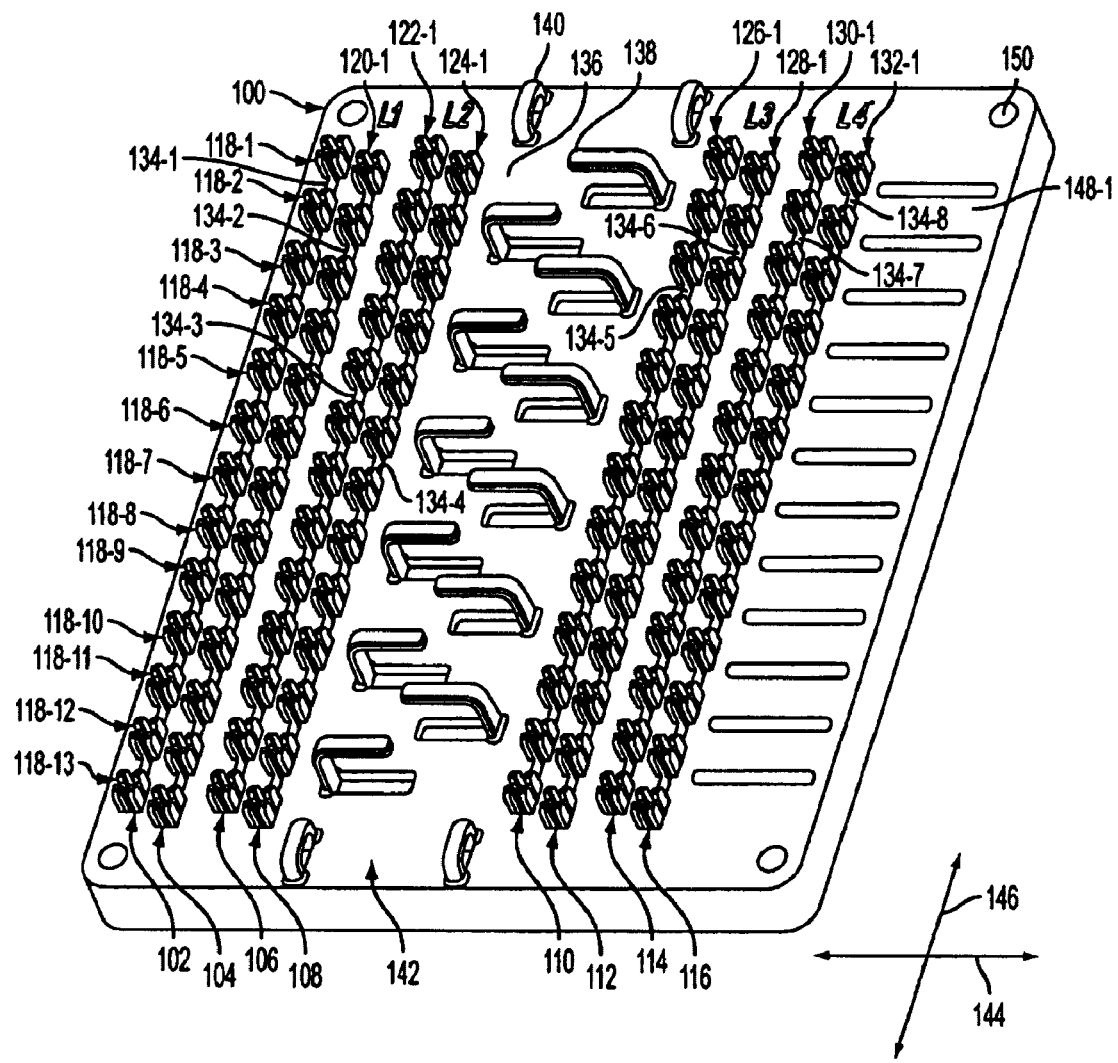
FIG. 1 is an isometric view of a telephone wire distribution center in accordance with the principles of this invention.

Referring to FIG. 1, a telephone wire distribution center 100 is shown. Distribution center 100 includes eight electrically conductive terminal strips 134-1, 134-2, 134-3, 134-4, 134-5, 134-6, 134-7, and 134-8 inserted into eight rows of insulation displacing punch down connectors 102, 104, 106, 108, 110, 112, 114, and 116 ("102–116"). Each row of insulation displacing punch down connectors 102–116, includes a plurality of insulation displacing punch down connectors, such as for instance, punch down connectors 118-1 through 118-13. As will be apparent, any other suitable number of punch down connectors could also be used for a particular row of punch down connectors.

To use distribution center 100 to connect one or more input telephone wire pairs to one or more output telephone wire pairs for distribution to multiple rooms throughout a house, a first wire of a first input wire pair (not shown) would typically be electrically connected to a terminal strip, such as terminal strip 134-1, for instance. Such a connection could be made by inserting an insulted wire into punch down connector 118-1, for instance. Punch down connectors 118-1 through 118-13 are preferably insulation displacing connectors, which are well known in the art and automatically strip the insulation from a wire so that the wire becomes electrically coupled to terminal strip 134-1. Similarly, the second wire of the first wire pair could be electrically coupled to terminal strip 134-2 via punch down connector 120-1. Once both paired wires of the first pair are connected to terminal strips 134-1 and 134-2 as just described, 12 pairs of output wires can be electrically coupled to the first paired input wire using punch down connectors 118-2 through 118-13 and the corresponding punchdown terminals in row 104, reference numbers for which have been omitted from FIG. 1 in an attempt to keep FIG. 1 as uncluttered as possible.

Second, third, and fourth paired input wires could also be electrically coupled to terminal strips 134-3 and 134-4; 134-5 and 134-6; and 134-7 and 134-8, respectively, in an analogous manner so that: terminal strip 134-3 is electrically coupled to the first wire of the second paired input wire; terminal strip 134-4 is electrically coupled to the second wire of the second paired input wire; terminal strip 134-5 is electrically coupled to the first wire of the third paired input wire; terminal strip 134-6 is electrically coupled to the second wire of the third paired input wire; terminal strip 134-7 is electrically coupled to the first wire of the fourth paired input wire; and terminal strip 134-8 is electrically coupled to the second wire of the fourth paired input wire.

The four input wires could be routed through channel 136, which separates rows 102, 104, 106, and 108 from rows 110, 112,114, and 116. Channel 136 may include wire channel hooks, such as wire channel hook 138 for retaining input and output wire pairs neatly and in an organized manner within channel 136. Cable tie mounting loops such as, for instance mounting loop 140 could be provided in order to facilitate bundling of input and/or output wire pairs to the front surface 142 of the distribution center 100.

While input wire pairs are generally organized horizontally, in other words, along the direction indicated by double-headed arrow 144, with first through fourth input wire pairs being electrically coupled to terminals strip pairs 134-1/134-2,134-3/134-4,134-5/134-6, and 134-7/134-8, output wire pairs are generally organized vertically, in other words, in the direction of double-headed arrow 146. For instance, the first paired input wire, also referred to as line 1, is coupled in series to each insulation displacing terminal connector 118-1 through 118-13. Accordingly, label area 148-1 provides space for a label such as master bedroom, or kitchen, or the like. A paired output wire (not shown) could be connected to terminal connector 118-2 and the corresponding paired terminal connector of row 104 to connect the paired output wire leading to the bedroom to input line 1. To change the input line to which that paired output wire is coupled, the output wire can simply be removed from the terminal connectors 118-2 and the corresponding paired terminal connector of row 104 and connected to a different pair of terminal connectors, for instance, a pair of connectors from rows 106 and 108 for line 2, a pair of connectors from rows 110 and 112 for line 3, or rows 114 and 116 for line 4.

In a similar manner, additional paired output lines can be labeled using other labeling areas below labeling area 148-1 for paired output wires leading to other rooms or locations in a house. A paired output wire leading to a particular location can then subsequently be readily identified, uncoupled from a first input line, and coupled to a different input line much more efficiently than is possible with prior art telephone wire distribution centers. Each punch down connector row 102–116 is shown in the drawings having 13 punch down connectors per row. As will be apparent, other suitable numbers of connectors per row may be used as desired. Similarly, while four input lines are shown, other desired numbers of input lines may also be used as desired.

Mounting holes, such as, for instance, mounting hole 150, are provided for mounting telephone wire distribution center 100 to a wall or other suitable surface.

Figure 2:
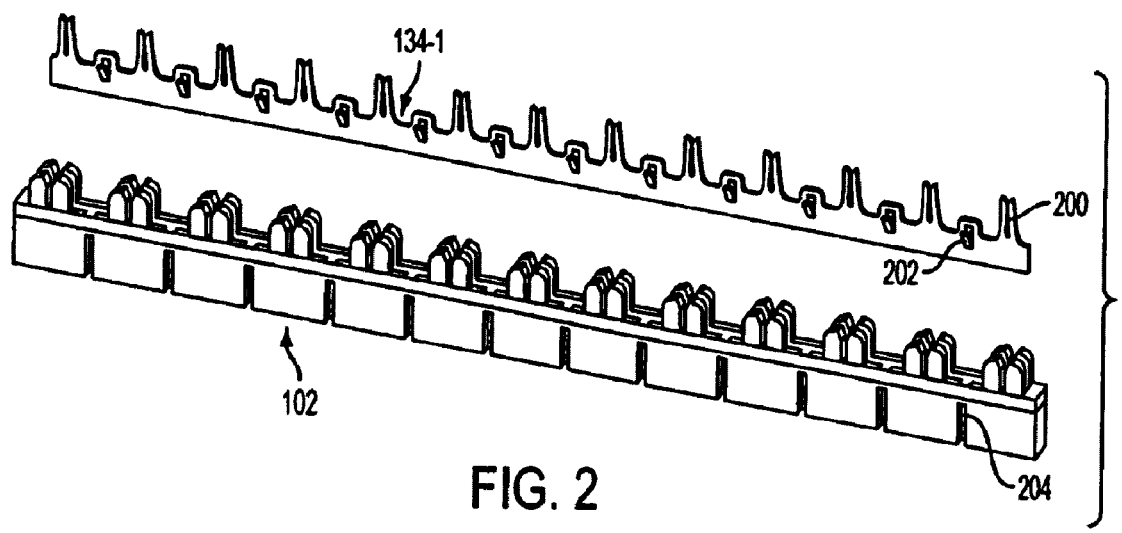
FIG. 2 is an isometric view of a row of insulation displacing punch down connectors and an electrically conductive terminal strip.
Figure 3:
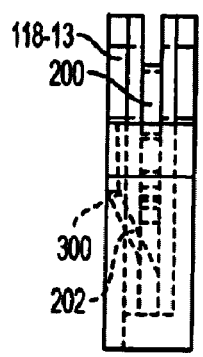
FIG. 3 is a right side view of a punch down terminal strip comprising the electrically conductive terminal strip shown in FIG. 2 inserted into the row of insulation displacing punch down connectors shown in FIG. 2.

Referring to FIG. 2, punch down connector row 102 and terminal strip 134-1 are shown in more detail than in FIG. 1. Terminal strip 134-1 may be made of plated metal or any other suitable electrically conductive material. Terminal strip 134-1 includes a plurality of termination areas, such as termination area 200 for electrically coupling wires to terminal strip 134-1. Terminal strip 134-1 includes a plurality of diagonally upwardly projecting fingers, such as finger 202 for engaging an upper surface 300 (shown in dashed line in FIG. 3) of a groove, such as groove 204 in order to keep terminal strip 134-1 from being inadvertently removed from punch down connector row 102 once terminal strip 134-1 has been inserted into punch down connector row 102.

As will be apparent to those of ordinary skill in the art, telephone distribution center 100 and punch down connector rows 102, 104, 106, 108, 110, 112, 114, and 116 may be made of plastic or any other suitable electrically non-conductive material using sterilography or any other suitable process for forming these components. Several of such processes are well known in the art.

This invention has been described with reference to certain preferred embodiments. Modifications may occur to others upon reading and understanding the foregoing detailed description. This invention includes all such modifications to the extent that they come within the scope of the appended claims or their equivalents.

The invention claimed is:

1. A telephone wire distribution center comprising:
a front substantially planar surface;
a plurality of pairs of punch down terminal strips attached to the front surface, wherein each punch down terminal strip includes a first termination area and a plurality of additional termination areas, wherein each termination area of a particular punch down terminal strip is electrically coupled in series by the particular punch down terminal strip to every other termination area of the same punch down terminal strip;
a plurality of input-wire-pair-labeling regions on the front surface for uniquely labeling a corresponding plurality of input-wire pairs relative to one another, wherein the input-wire-pair-labeling regions' respective locations are substantially in line with a corresponding plurality of respective longitudinal axes of the plurality of pairs of the punch down terminal strips thereby indicating that respective pairs of the punch down terminal strips correspond to respective input-wire pairs, and
a plurality of output-wire-pair-destination-labeling regions for labeling respective places to which corresponding output-wire pairs are run, the plurality of out-wire-pair-destination-labeling regions being located on the front surface along respective output-wire-pair-destination-labeling-region axes that are: (1) substantially perpendicular to the longitudinal axes of the plurality of pairs of punch down terminal strips and (2) substantially in line with respective termination areas of the plurality of additional termination areas of the plurality of pairs of punch down terminal strips such that for each output-wire pair that is coupled to an input-wire pair, the input-wire pair is uniquely labeled relative to other input-wire pairs along the longitudinal axis of the pair of punch down terminal strips to which the input-wire pair is coupled and an output-wire-destination-labeling region is located along an output-wire-pair-destination-labeling-region axis that is substantially in line with the termination area at which the output-wire pair is coupled to the pair of punch down terminal strips such that the input-wire pair label and the output-wire-pair-destination-labeling region are located along respective perpendicular axes that intersect substantially at the termination area at which the the output-wire pair is coupled to the pair of punch down terminal strips, 2. The telephone wire distribution center of claim 1, wherein the front surface comprises: a wire channel for routing paired telephone wires.

3. The telephone wire distribution center of claim 2, further compromising: at least one wire channel hook for retaining wire pairs in the wire channel.

4. The telephone wire distribution center of claim 2, wherein the wire channel is located between two pairs of the punch down terminal strips.

5. The telephone wire distribution center of claim 4, wherein the wire channel separates a first two pairs of the punch down terminal strips from a second pair of the punch down terminal strips.

6. The telephone wire distribution center of claim 5, further comprising a label for each input telephone-wire pair electrically coupled to one of the punch down terminal strips.

7. The telephone wire distribution center of claim 1, further comprising: at least one tie-wire ring for bundling a plurality of wires to the distribution center.

8. The telephone wire distribution center of claim 1, wherein at least one of the punch down terminal strips comprises a row of insulation displacing connectors.

9. The telephone wire distribution center of claim 9 wherein at least one punch down terminal strip comprises: an electrically conductive terminal strip inserted into a row of insulation displacing connectors.

10. The method of organizing telephone wires as in claim 2, further comprising the step of: bundling the plurality of wires in the wire channel.

11. A method of organizing telephone wires comprising the steps of: connecting a plurality of paired input wires to a respective plurality of labeled pairs of electrically conductive terminal strips, wherein each of the plurality of labeled pairs of electrically conductive terminal strips is uniquely labeled relative to others of plurality of labeled pairs of electrically conductive terminal strips, wherein the unique labels are located substantially in line with a corresponding plurality of respective longitudinal axes of the plurality of pairs of the electrically conductive terminal strips thereby indicating that respective pairs of the electrically conductive terminal strips correspond to respective input-wire pairs;
connecting a plurality of paired output wires to a corresponding plurality of termination areas of each of the plurality of pairs of electrically conductive terminal strips; and labeling output-wire-pair destinations on the distribution center such that the output-wire-pair destinations are labeled along respective output-wire-destination-labeling axes that are: (1) substantially perpendicular to the longitudinal axes of the plurality of pairs of punch down terminal strips and (2) substantially in line with respective termination areas of the plurality of termination areas of the plurality of pairs of punch down terminal strips such that for Each output-wire pair that is coupled to an input-wire, the input-wire pair is uniquely labeled relative to other input-wire pairs along the longitudinal axis of the pair of punch down terminal strips to which the input-wire pair is coupled and an output-wire-destination label, which specifies a place to which the paired output wires are run, is located along an output-wire-pair-destination-labeling axis that is substantially in line with the termination area at which the output-wire pair is coupled to the pair of punch down terminal strips such that the output-wire pair label and the output-wire-pair-destination label are located alone respective perpendicular axes that intersect substantially at the termination area at which the output-wire pair is coupled to the pair of punch down terminal strips.

12. The method of organizing telephone wires as in claim 1, further comprising the step of: routing paired telephone wires wire channel hooks in a wire channel of the wire distribution center.

13. A telephone wire distribution center comprising:
means for connecting a plurality of paired input wires to a respective plurality of labeled pairs of electrically conductive terminal strips, wherein each of the plurality of labeled pairs of electrically conductive terminal strips is uniquely labeled relative to others of the plurality of labeled pairs of electrically conductive terminal strips, wherein the unique labels are located substantially in line with a corresponding plurality of respective longitudinal axes of the plurality of pairs of the electrically conductive terminal strips thereby indicating that respective pairs of the electrically conductive terminal strips correspond to respective input-wire pairs;
means for connecting a plurality of paired output wires to a corresponding plurality of termination areas of each of the plurality of pairs of electrically conductive terminal strips; and
means for labeling output-wire-pair destinations on the distribution center such that the output-wire-pair destinations are labeled along respective output-wire-pair-destination-labeling axes that are: (1) substantially perpendicular to the longitudinal axes of the plurality of pairs of punch down terminal strips and (2) substantially in line with respective termination areas of the plurality of termination areas of the plurality of pairs of punch down terminal strips such that, for each output-wire that is coupled to an input-wire pair, the input-wire pair is uniquely labeled relative to other input-wire pairs along the longitudinal axis of the pair of punch down terminal strips to which the input-wire pair is coupled and an output-wire-destination label, which specifies a place to which the paired output wires are run, is located along an output-wire-pair-destination-labeling axis that is substantially in line with the termination area at which the output-wire pair is coupled to the pair of punch down terminal strips such that the input-wire-pair label and the output-wire-destination label are located along respective perpendicular axes that intersect substantially at the termination area at which the output-wire pair is coupled to the pair of punch terminal strip.

14. The telephone wire distribution center as in claim 13, further comprising: means for routing paired telephone wires through wire channel hooks in a wire channel of the wire distribution center.

15. The telephone wire distribution center as in claim 14, further comprising: means for bundling the plurality of wires in the wire channel.

* * * * *